United States Patent [19]

Stephens

[11] Patent Number: 4,959,542

[45] Date of Patent: Sep. 25, 1990

[54] OPTO-ELECTRONIC SCALE-READING APPARATUS

[75] Inventor: William F. N. Stephens, Hawkesbury Upton, United Kingdom

[73] Assignee: Renishaw Plc, Gloucestershire, United Kingdom

[21] Appl. No.: 368,075

[22] Filed: Jun. 15, 1989

Related U.S. Application Data

[63] Continuation of Ser. No. 217,038, Jul. 11, 1988, abandoned, which is a continuation of Ser. No. 899,805 filed as PCT GB85/00600 on Dec. 23, 1985, published as WO86/03833 on Jul. 3, 1986, abandoned.

[30] Foreign Application Priority Data

Dec. 22, 1984 [GB] United Kingdom ............... 8432574

[51] Int. Cl.$^5$ ............................................. H01J 3/14
[52] U.S. Cl. ........................... 250/237 G; 250/231.18
[58] Field of Search ................. 250/237 G, 231 SE; 33/125 A; 356/373, 374, 375

[56] References Cited

U.S. PATENT DOCUMENTS

| | | | |
|---|---|---|---|
| 3,344,700 | 10/1967 | Brake . | |
| 3,796,498 | 3/1974 | Post | 250/237 G |
| 3,812,352 | 5/1974 | MacGovern . | |
| 3,833,807 | 9/1974 | Takeda | 250/237 G |
| 4,051,367 | 9/1977 | Sayce et al. | 250/237 G |
| 4,079,252 | 3/1978 | Brake | 250/237 G |
| 4,115,008 | 9/1978 | Shepard . | |

FOREIGN PATENT DOCUMENTS

| | | |
|---|---|---|
| 1002954 | 9/1965 | United Kingdom . |
| 1504691 | 3/1978 | United Kingdom . |
| 1516536 | 7/1978 | United Kingdom . |
| 2095399 | 3/1981 | United Kingdom . |
| 1592705 | 7/1981 | United Kingdom . |

OTHER PUBLICATIONS

Moire'Streifen in der Mebtechnik, Shepard et al., 827 Werstatt & Betrieb, vol. 112 (1979) Nov., pp. 782-786.
Japanese Abstract No. 59-10661, Optical Scale Reader, 1984.

*Primary Examiner*—David C. Nelms
*Assistant Examiner*—Khaled Shami
*Attorney, Agent, or Firm*—Spencer & Frank

[57] ABSTRACT

An opto-electronic scale-reading apparatus comprising a scale defined by marks provided on one of two members, a read head provided on the other member and including diffraction means for producing interference fringes having movement relative to the read head responsive to a displacement between the scale and the read head, and detecting means for detecting the movement of the interference fringes. The scale marks may have periodicities differing from a nominal value, and the apparatus includes a spatial filter whereby scale periodicities, differing from the nominal value by more than a given maximum, are prevented from contributing to the production of said fringes.

25 Claims, 5 Drawing Sheets

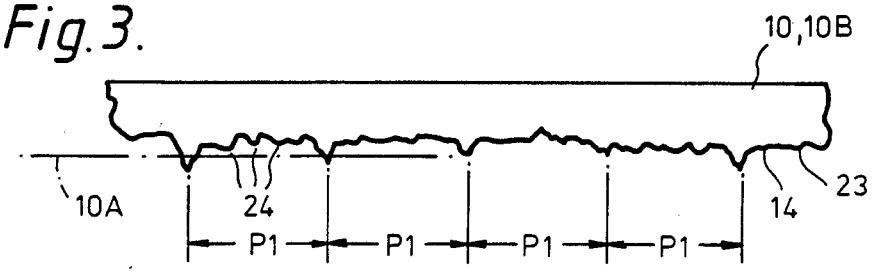
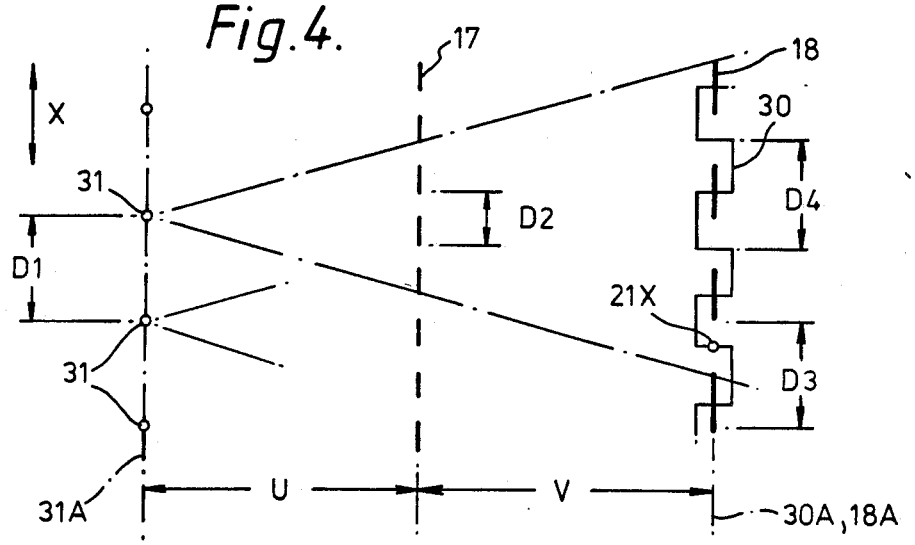
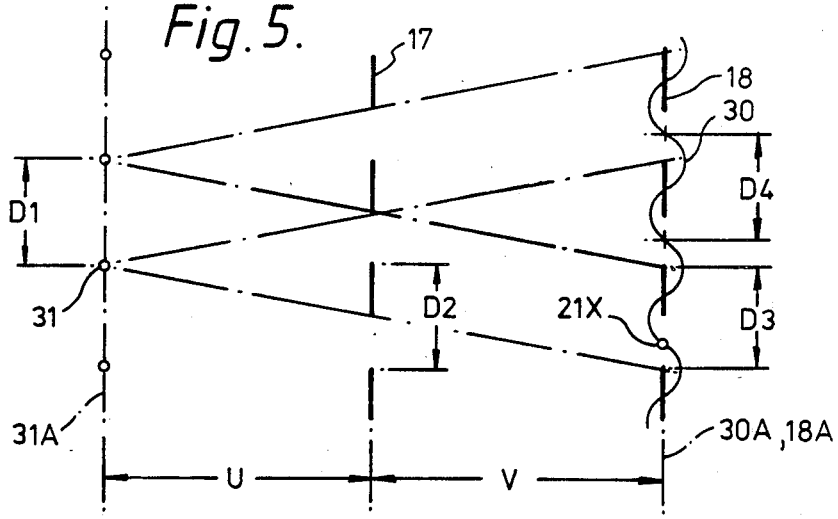

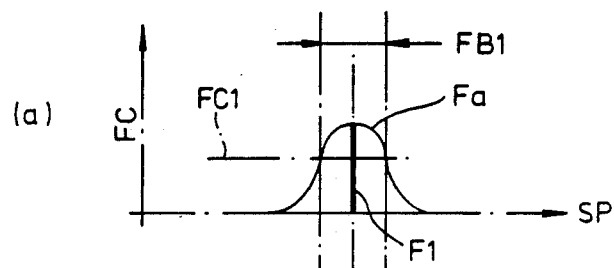
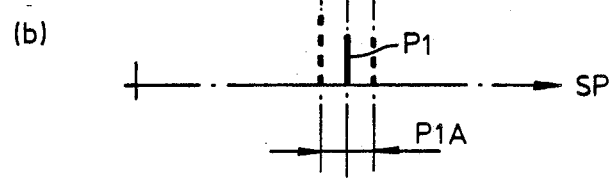
Fig. 6.
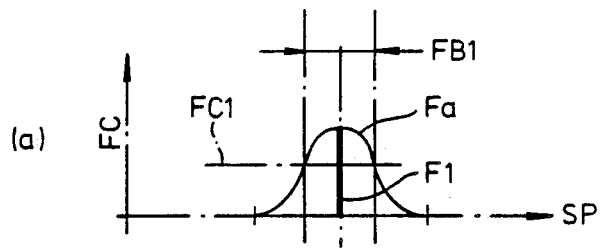
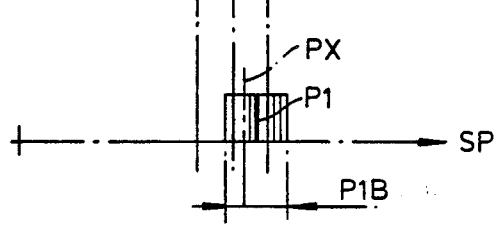
Fig. 7.

OPTO-ELECTRONIC SCALE-READING APPARATUS

This application is a continuation of application Ser. No. 217,038, filed July 11, 1988, abandoned which is a continuation of application Ser. No.879,805, filed as PCT GB85/00600 on Dec. 23, 1985, published as WO86/03833 on Jul. 3, 1986, now abandoned.

BACKGROUND OF THE INVENTION

This invention relates to opto-electronic scale-reading apparatus for use in measuring relative displacement of two members. In such known apparatus e.g. British Patent No. 1,504,691 the scale comprises a diffraction grating co-operating with at least one other grating on a read head to produce interference fringes which move relative to the read head during a said displacement of the members, and said measurement is a count of said fringes. It is clear that such a scale has to be of diffraction quality, i.e. the accuracy and reliability of the measurement depends on such parameters as the regularity of the spacing of the scale marks, the sharp definition of the edges of the marks, and the freedom of the scale from scratches and like imperfections. Such a scale can be expensive to produce and protect especially when the scale has to be relatively long.

It is among the objects of this invention to overcome or reduce this difficulty.

It is also known to increase the number of signals obtainable from any two adjacent marks of the scale by phase quadrature interpolation. Known scale-reading apparatus can be subject to phase errors and consequent interpolation errors. It is optionally an object of this invention to overcome or reduce this difficulty.

SUMMARY OF THE INVENTION

According to this invention there is provided apparatus for measuring displacement between two members, comprising a scale defined by marks provided on one of the members, a read head provided on the other member diffraction means for producing interference fringes having movement relative to said read head responsive to a said displacement, and detecting means for detecting said movement, characterized in that there is provided a spatial filter including said diffraction means and mounted on said read head, the filter being tuned to a nominal periodicity lying within a band of periodicities defining the pass band of the filter, the marks of said scale are defined by light sources positioned to illuminate said diffraction means and having a periodicity lying within said pass band, and the light from said sources interacting with said diffraction means to produce said fringes.

It will be seen that in the apparatus according to this invention the diffraction mechanism takes place entirely in the read head. The scale is merely required to provide a pattern of light sources. Thus the scale is not required to be a diffraction grating and the provision of the marks on the scale does not have to be of diffraction quality. The scale may have relatively imperfect markings or the markings of the scale may be capable of being produced with greater economy than in known apparatus.

Further, the read head according to this invention is inherently convolutional, i.e. the fringes constitute a convolution of the scale pattern with a substantially sinusoidal pattern. This makes the read head substantially free from phase quadrature errors.

BRIEF DESCRIPTION OF THE DRAWINGS

Embodiments of apparatus according to this invention, will now be described with reference to the accompanying drawings wherein:

FIG. 3 is an enlarged detail of FIG. 1,
FIG. 4 is a light ray diagram of a first embodiment,
FIG. 5 is a light ray diagram of a second embodiment,
FIG. 6 is a first diagram showing at (a) the response curve of a filter and at (b) a scale periodicity variation,
FIG. 7 is a second diagram showing at (a) the response curve of a filter, at (b) a band of scale periodicities, and at (c) a different position of the latter band.

DESCRIPTION OF THE PREFERRED EMBODIMENTS

General Description of Apparatus

Figure 1:
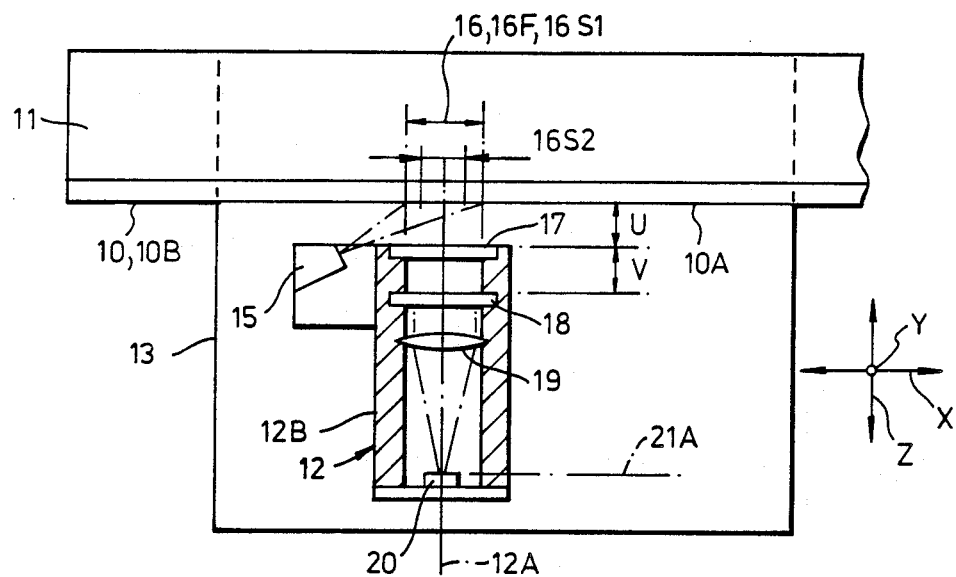
FIG. 1 is a plan view of the apparatus.
Figure 2:
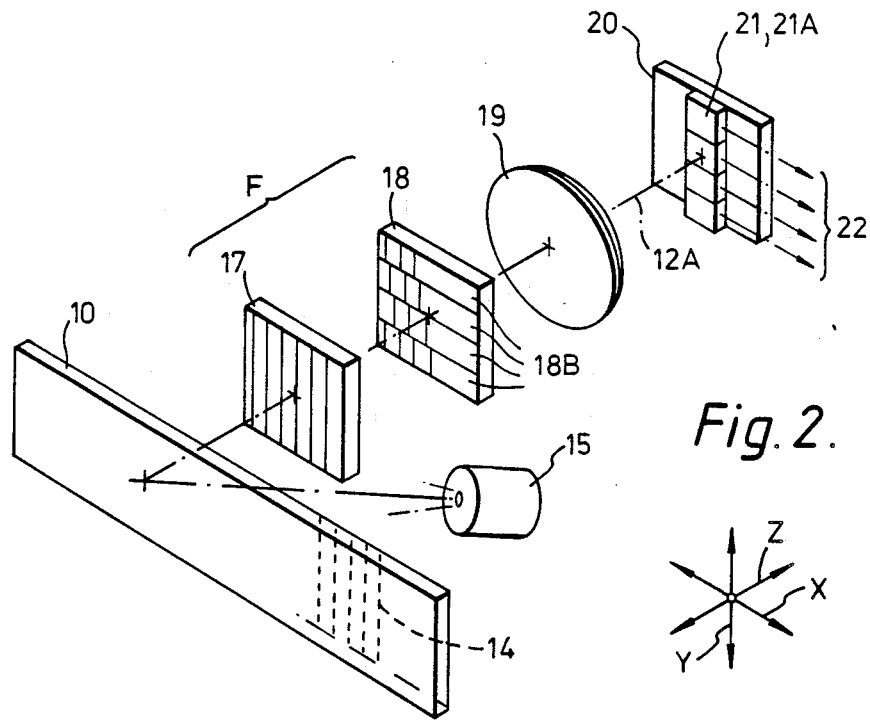
FIG. 2 is a perspective view of FIG. 1.

Referring to FIGS. 1 to 3, there is shown a linear scale 10 secured to a track 11. A read head 12 is secured to a carriage 13 supported on the track 11 for linear movement in a direction X which is the direction of the length of the scale. The scale has marks 14 (FIGS. 2, 3) defined by lines extending in a direction Y perpendicular to the direction X. The head 12 has an axis 12A extending in a direction Z perpendicular to both the directions X and Y. The head embodies a read head light source 15 positioned to illuminate the scale over a sampling region or range 16. The head further comprises, in succession from the scale 10 and along the axis 12A, a first or index grating 17, a second or analyser grating 18, a lens 19, and a sensor assembly 20 preferably comprising sensor sections 21 (FIG. 2) having output signals 22 representing movement of the carriage 13 along the track 11.

The relative position of the scale 10 and the grating 17 is such that the light from the source 15 is reflected at the marks 14 to illuminate the grating.

The scale 10 (FIG. 3) comprises a body 10B to which the marks 14 are applied at a given periodicity, i.e. at given periods or pitches. The marks may have a single periodicity indicated by periods P1. Alternatively, the marks may be arranged in accordance with a number of periodicities defining a band, the "scale band", and including said single periodicity as a dominant periodicity among a range of secondary periodicities, all as defined later herein. The scale band may be produced by a random variation in the periods of the markings along the length of the scale.

Said random variations are indicated in FIG. 3 as a surface structure 23 having substantially randomly distributed reflective regions 24 including regions having the period P1. Such a scale profile can be more economical to produce than a scale in which only a single periodicity is present.

As will be explained in detail hereinafter, the apparatus comprises a spatial filter having a nominal periodicity determined by optical parameters of the read head and having a pass band determined by the sampling region 16. The dominant periodicity of the light sources defined by the scale marks 14 lies within the pass band of the filter. The filter responds to the latter sources and acts on the sensor 20 to produce the signals 22.

Filter Geometry

The regions 24 define light sources and the grating 17 is spaced from the scale 10 to be illuminated by said sources and, by diffraction, to produce fringes 30 in a fringe plane 30A located at the side of the grating 17 remote from the scale 10. Referring to FIG. 4, the grating 17 is an amplitude grating, typically a Ronchi grating, and use is made of the diffraction phenomenon known as "self imaging" or "Fourier imaging" of periodic transmission masks.

This phenomenon requires for this type of grating that the following expressions are satisfied:

$$1/u + 1/v = \lambda/(n \times D2^2) \quad (1)$$

$$D2/D3 = u/(u+v) \quad (2)$$

$$D2/D1 = v/(u+v) \quad (3)$$

wherein:
- $u$ = the distance between a generating plane 31A and the grating 17, the plane 31A lying in the XY directions and containing a reflected notional point source 31 being of substantially monochromatic light and giving rise to the fringes 30 which are represented by a square wave, as shown, since these fringes are a self image of the grating 17;
- $v$ = the distance between the gratings, 17, 18;
- $\lambda$ = the wave length of the light;
- $D1$ = the pitch of a plurality of said point sources lying in the plane 31A and co-operating to reinforce the fringe pattern;
- $D2$ = the pitch of the grating 17;
- $D3$ = the pitch of the grating 18;
- $D4$ = the pitch of the fringes 30 formed at the plane 30A;
- $n$ = a positive integer.

The head 12 and the scale 10 are matched by making the pitch D1 of the head and the pitch P1 of the scale the same, and the head is so positioned relative to the scale that the plane 31A of the reflected light sources 31 is substantially coincident with the plane, 10A, of the scale. The notional light sources 31 are then actual sources defined by light reflected from surface features of the scale forming the dominant periodicity P1 and associated secondary periodicities.

During relative movement of the head 12 and the scale 10, the resulting movement of the light sources 31 in the generating plane 31A in the direction X produces a corresponding movement of the fringes 30, also in the direction X, relative to read head 12. If u and v are equal, the amount of the movement of the fringes 30 relative to the read head 12, is the same as that of said relative movement of the head and the scale. A hypothetical point sensor 21X situated in the plane 30A of the fringes will detect fluctuations in light intensity as the fringes pass across it. The grating 18 has a pitch D3 equal to the fringe pitch D4 and is arranged for its plane 18A to coincide with the plane 30A.

The sensor sections 21 are provided for sensing subdivisions of the fringe pitch conveniently generated by dividing the grating 18 into sections 18B (FIG. 2) whose grating marks are mutually offset. Four such grating sections 18B, and correspondingly four said sensor sections 21, may be provided to divide the fringe pitch by four. Alternatively, a similar effect is achieved by placing the grating 18 in a tilted position relative to the grating 17 thereby to produce at the plane 30A moire fringes sensed in phase quadrature by the sensor assembly in a manner known per se.

It will be clear that, in this example, the performance of the head 12 is governed by relatively strict adherence to the relationships given by equation (1). Notably, the formation of the fringes is dependent on wave length. Departure from an ideally single wave length causes reduction in contrast of the fringes. This reduction is made worse as the value of n is increased although a high value of n may be desirable for practical reasons e.g. so as not to be restricted to too small a spacing of the head 12 and the scale 10. However, a practical head can be constructed by using values n between 2 and 16, together with a value of 20 microns for D1 and a wave length of 900 nanometers.

Inevitably small variations in the spacing between the head and the scale can produce reading errors. The lens 19 which is introduced to overcome this difficulty is a telecentric device having a front focal plane preferably lying at the scale plane 10A and a rear focal plane lying at the plane, 21A, of the sensor assembly, and the lens 19 allows said variations without necessarily invalidating equation (2) and/or (3).

In the second embodiment (FIG. 5) the parameters of the head 12 are given wholly by:

$$D2/D3 = 2u/(u+v) \quad (4)$$

$$D2/D1 = 2v/(u+v) \quad (5)$$

$$1/u + 1/v = \lambda/[(n+\tfrac{1}{2}) \times D2^2] \quad (6)$$

The restriction of equation (1) does not apply at all in this case. However, equation (6) should be applied when n is low and/or the light is substantially monochromatic. Otherwise, the fringe contrast is substantially independent of wave length and broad-band light, e.g. white light, may be used. Further, in this embodiment, fringes of a given pitch are formed dependent only on the ratio u/v and not on the absolute values u and v. There is some loss of fringe contrast associated with the formation of fringes in this case, but this is overcome by using a phase grating for the grating 17. Generally, this embodiment would be the prefered embodiment of the invention.

The pitch D1 is also referred to as the "nominal periodicity" of the filter, and the filter may be said to be tuned to read only those marks 14 of the scale 10 which have the nominal periodicity of the filter or as will be explained, which lie within the pass band of the filter.

A housing 12B (FIG.1) support the gratings 17, 18 at the spacing v and a support means support the housing 12B relative to the scale 10 at the distance u between the scale 10 and the grating 17. In the present example said support means is defined by the track 11 and the carriage 13.

Convolution

It can be shown on the basis of Fourier theory, that an optical convolution is performed between the two patterns, being respectively the scale patterns 24 and the fringe pattern 30, due to a single light source 31 illuminating the grating 17 (FIGS. 3, 4, 5,). Since the fringe pattern is substantially sinusoidal, it can be shown that said convolution represents a spatial filtering of the light distribution of the scale in favour of the spatial periodicity of the fringe pattern produced by said single light source. The filtering action is strengthened by a second convolution in this case between the fringe pattern 30 and the grating 18.

The convolutional character of the read head 12 has the advantage that the read head 12 is substantially independent of angular misalignment, particularly about the Z axis, between the read head 12 and the scale 10, thus rendering the read head substantially immune to quadrature phase error due to such misalignment. This is due to the fact that the gratings 17, 18 are fixed one relative to the other and the fringes 30 have a fixed alignment with the lines of the grating 17. Therefore, the head 12 can be set up, relative to the scale, by simple mechanical methods, such as setting gauges and it is not normally necessary, during setting up, to monitor the phase of the signals 22 and make adjustments in the head position to eliminate phase errors as between the respective signals 22.

Relationship of Filter and Scale

The periodicity to which the filter is tuned lies within a band of periodicities constituting the pass band of the filter or the "filter band" which is defined as the inverse of the length of the illuminated or sampling region 16 (FIG. 1) insofar as that region lies within the optical aperture of the grating 17.

The region 16 may be illuminated over a length less than the greatest possible aperture of the grating 17 in which case the effective aperture is less than said greatest possible aperture. In any case, the filter band is the inverse of the region 16. In practice, given that the scale has the periodicity P1, the filter F is designed to be tuned to the periodicity P1 and the pass band of the filter F is chosen in terms of said region 16. To cope with a given tolerance in the periodicity of the scale, i.e. in the spacing of the marks 14, due to manufacturing tolerances, the pass band of the filter is made sufficiently wide to include that tolerance; so long as the dominant scale periodicity P1 is detectably present on the scale in the sense of lying within said sampling region 16 and within the pass band of the filter. It will be clear that the greater the length of the region 16 the narrower is the filter band and vice versa.

FIG. 6 is a diagram showing the relationship between a given pass band FB1 of the filter and the dominant periodicity P1 as the only periodicity of the scale. The curve Fa represents the whole response of the filter F in terms of the contrast FC of the fringes 30 for different scale periodicities SP. A fringe contrast above a line FC1 is sufficient to produce a signal 22 (FIG. 2).

So long as the periodicity P1 lies within the band FB1, the filter F can respond to it and produce a signal 22 of acceptable amplitude. While being uniform within the sampling region, in any one position of the read head along the scale, the periodicity P1 may vary, as between different positions of the sampling region along the scale, over a range P1A and produce a signal 22 so long as the range P1A lies within the filter band FB1. The filter responds in sympathy with any changes in the periodicity within the range P1A.

This is acceptable for a given error tolerance. However, the arrangement has the advantage of relatively good freedom from phase quadrature error. In a typical example, the nominal periodicity is 20 micron and the width of the pass band is 0.1 micron for a sample period 16 of 10 mm. If the range P1A is 0.05 micron, the error tolerance would have to be 0.25%, i.e. 2.5 mm per m. However, this can be compensated for and be reduced, typically, to 20 microns per m.

FIG. 7 shows a band of scale periodicities P1B present within the sampling region 16 and including the dominant periodicity P1 substantially at the centre of the band. If the dominant periodicity coincides with the nominal periodicity of the filter, the filter response is in accordance with the nominal periodicity. However, if, as shown as (c) the position of the scale band relative to the pass band of the filter is such that the dominant periodicity lies to one side of the nominal periodicity of the filter, the filter tends to respond to a scale periodicity Px closer to the nominal periodicity of the filter than the dominant periodicity; the dominant periodicity must still lie within the pass band of the filter. A consequence of this arrangement is that the accuracy of the apparatus is higher than in the example of FIG. 6. In other words, the introduction of a band of periodicities about the dominant periodicity, leads to improved accuracy while still maintaining said relatively good freedom from phase quadrature errors.

Figure 8:
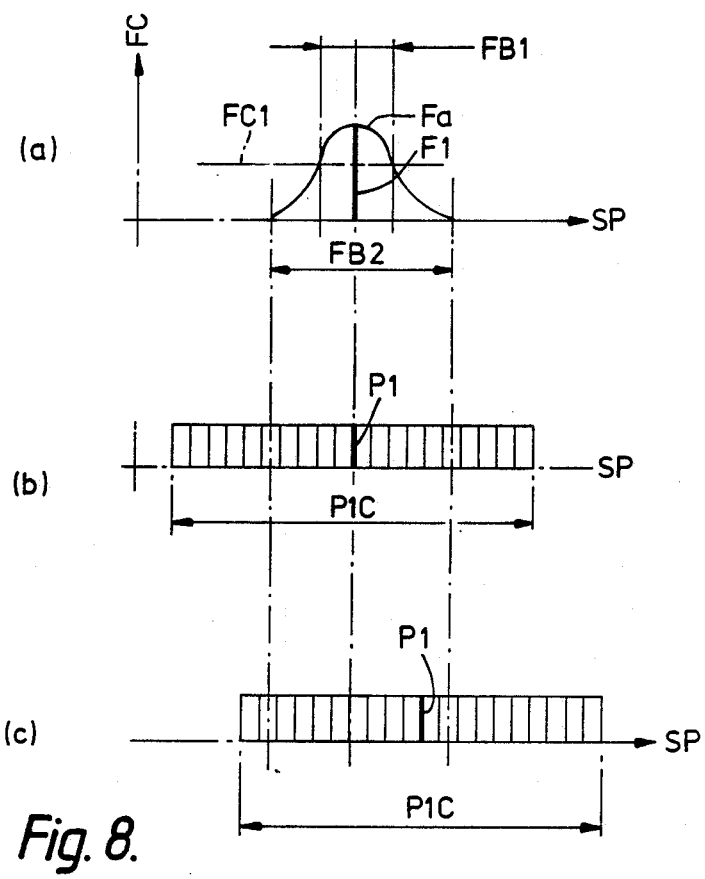
FIG. 8 is a third diagram showing at (a) the response curve of a filter, at (b) a band of scale periodicities, and at (c) a different position of the latter band.

FIG. 8 shows a scale band P1C exceeding the filter band FB1. In this case, even though the dominant frequency still remains within the pass band FB1, the filter can see scale periodicities, not only in the pass band, but over the entire range, FB2, of the filter curve Fa. This contributes to building up improved accuracy by virtue of allowing the filter to respond even more closely to its nominal periodicity.

Scale Geometry

Figure 9:
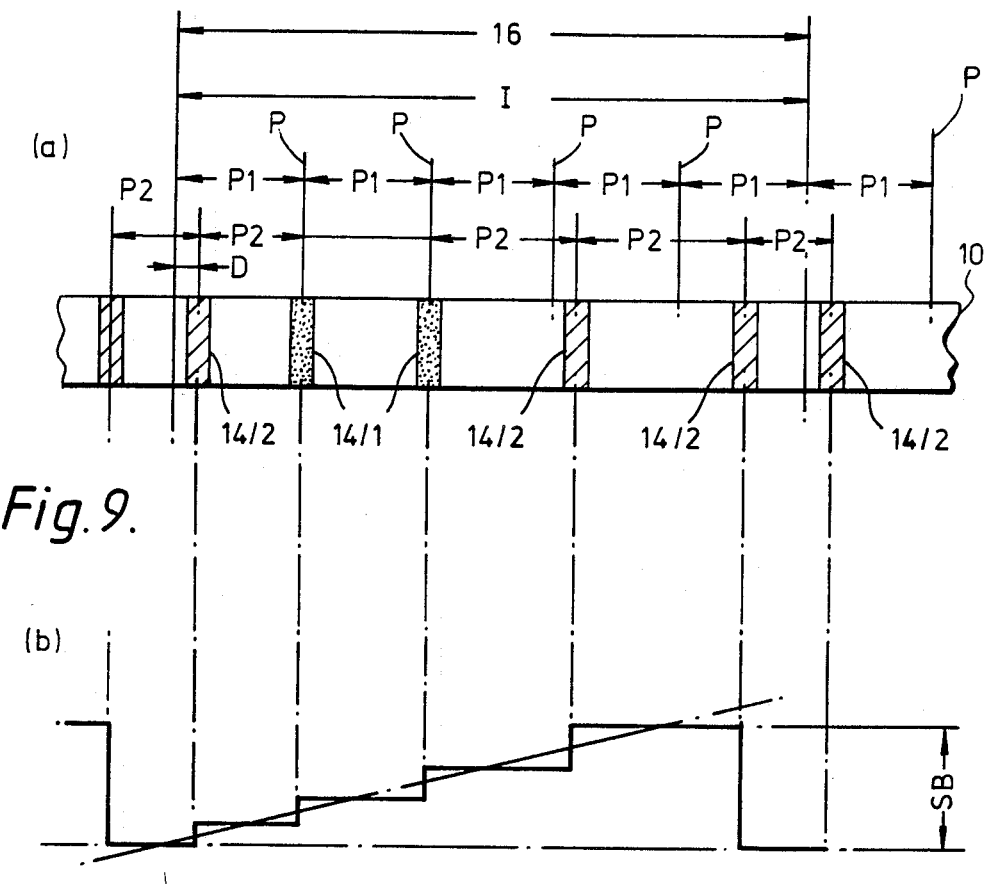
FIG. 9 shows at (a) an enlarged representation of a scale showing a modulation of the scale marks, and at (b) demonstrating the ramp characteristic of this modulation.

FIG. 9 represents a part length of the scale 10 showing positions P spaced along the scale at the dominant periodicity defined by the periods P1. A pair of reflective marks 14/1 are provided at two adjacent positions P at regular intervals I along the scale. The intervals I are each an integer multiple of the period P1 and the sampling region 16 substantially extends over a distance equal to one such interval I. In an example, the period P1 is 20 micron, the interval I is 8 mm and the sampling region is 10 mm.

Figure 10:
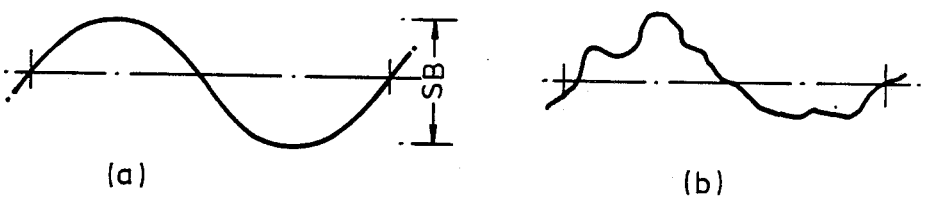
FIG. 10 is a diagram of characteristics of the modulation showing different such characteristics at (a) and (b)

Further reflective marks 14/2 are provided on the scale in positions offset from the positions P by departures or distances D, thus giving rise to secondary periodicities defined by periods P2 which, in this example, vary in accordance with a ramp-shaped characteristic. Alternatively, the characteristic may be sinusoidal (FIG. 10a) within each sampling region with corresponding sinusoidal variation in the secondary periodicities. Alternatively, the distances D may vary so that the characteristic is random (FIG. 10b).

In most cases it is desirable that the maximum departure D from any one position P is less than one half, preferably one quarter, of the period P1 because any greater such departures could result in destructive interference in the filter F such that certain periodicities, including the dominant periodicity, are not detectable. This would lead to a condition that all or some periodicities are no longer detectably present in the apparatus with consequent failure of the reading.

Figure 11:
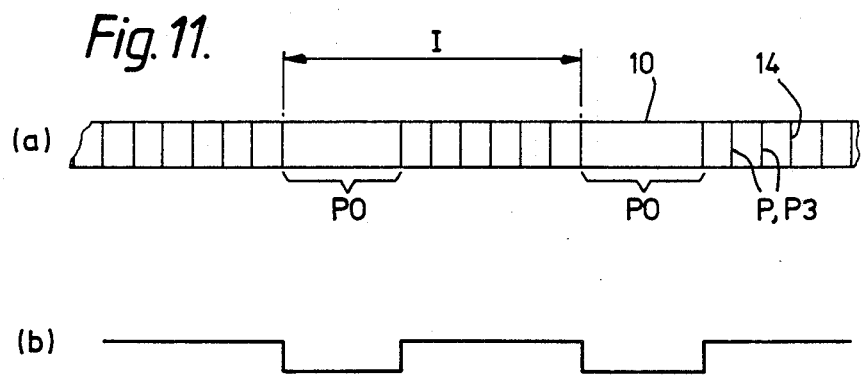
FIG. 11 is an enlarged representation of a scale showing at (a) amplitude modulation of the scale periodicity and at (b) the binary characteristic of the modulation in this case.

The foregoing departures D may be described as phase or frequency modulation of the scale marks. Amplitude modulation may be provided (FIG. 11) by arranging the marks 14 at selected groups of positions P while leaving the remaining positions P unmarked as shown at P0. The unmarked positions may vary in any appropriate, regular or random pattern.

It would not be appropriate from the modulation point of view if, for example, every second or third position P were unmarked i.e. if the period between any two marks 14 were the same integer multiple of the nominal frequency D1 of the filter, but this may infact be done to provide what is in effect a coarse-pitch scale.

I claim:

1. Apparatus for measuring displacement between two members, comprising:
   (a) a scale on one of the members having marks defined by a light pattern;
   (b) a read head provided on the other member;
   (c) periodic diffraction means provided in the read head for interacting with said light pattern to produce interference fringes having movement relative to said read head responsive to a said displacement;
   (d) there being a nominal periodicity determined by the read head, and defining the periodicity which the scale must have to satisfy optical parameters of said read head; and
   (e) detecting means for detecting said movement, wherein
   (f) said scale marks have secondary periodicities offset by departures from said nominal periodicity;
   (g) means are provided defining the length of an effective sampling region of the scale, only light from said effective sampling region contributing to the production of said interference fringes;
   (h) the diffraction means and said means for defining the length of an effective sampling region constitute a spatial filter passing said nominal periodicity; and
   (i) said filter has a passband determined by the length of said effective sampling region and defining a maximum value of said departure, whereby secondary periodicities below said maximum departure contribute to production of said fringes, while secondary periodicities above said maximum departure do not contribute to production of said fringes.

2. Apparatus according to claim 1 wherein the secondary periodicities arise by virtue of a random variation in the period of the marks.

3. Apparatus according to claim 1 wherein the secondary periodicities arise by virtue of a ramp-shaped variation in the period of the marks.

4. Apparatus according to claim 1 wherein the secondary periodicities arise by virtue of a sinusoidal variation in the period of the marks.

5. Apparatus according to claim 1 wherein the secondary periodicities arise by virtue of imperfections including scratches of the scale.

6. Apparatus according to claim 5 wherein the parameters of said read head are additionally given by the expression $$1/u + 1/v = \lambda/[(n + T_M) \times D2^2] \quad (6)$$

wherein is the wave length of the light employed.

7. Apparatus according to claim 1 wherein said periodic diffraction means is a phase grating.

8. Apparatus according to claim 1, said scale defining positions for said marks, and wherein said secondary periodicities arise by virtue of said marks being arranged in groups at selected said positions, the remaining said positions being left unmarked.

9. Apparatus according to claim 1 wherein said secondary periodicities vary, within said pass band, over the length of said scale but are substantially uniform within any one said sampling region along said scale.

10. Apparatus according to claim 1, wherein said scale marks define sources of illumination, and wherein said periodic diffraction means comprises a diffraction grating spaced from the scale to be illuminated by said marks and positioned to produce said interference fringes at a plane spaced from said grating at the side thereof remote from said scale.

11. Apparatus according to claim 1, wherein said scale marks define sources of illumination and the apparatus comprises a first grating defining said diffraction means spaced from said scale to be illuminated by said marks to produce said interference fringes at a fringe plane at the side of said first grating remote from said scale, a second grating situated at said fringe plane to reveal a light modulation due to movement of the interference fringes, the light from said sources passing in succession through said first and second grating to the side of said second grating remote from said first grating, and wherein said detecting means is provided at the remote side of said second grating for sensing said modulation.

12. Apparatus according to claim 11 wherein said optical parameters are given by the expressions:

$$1/u + 1/v = \lambda/(n \times D2^2) \quad (1)$$

$$D2/D3 = u/(u+v) \quad (2)$$

$$D2/D1 = v/(u+v) \quad (3)$$

wherein:
u = the distance between a plane containing said sources of illumination and a plane containing said first grating;
v = the distance between said first and second grating;
λ = the wave length of the light;
D1 = the pitch pertaining to said nominal periodicity;
D2 = the pitch of said first grating;
D3 = the pitch of said second grating;
n = a positive integer.

13. Apparatus according to claim 11 wherein said optical parameters are given by the expressions:

$$D2/D3 = 2u/(u+v) \quad (4)$$

$$D2/D1 = 2v/(u+v) \quad (5)$$

wherein:
u = the distance between a plane containing said sources of illumination and a plane containing said first grating;
v = the distance between said first and second gratings and said first grating;
D1 = the pitch pertaining to said nominal periodicty;
D2 = the pitch of the first grating;
D3 = the pitch of said second grating.

14. Apparatus according to claim 1 wherein said spatial filter comprises an optical aperture dimensioned to limit said optical interaction to a corresponding said sampling region of said scale, said pass band being inversely proportional to the length of said sampling region.

15. Apparatus according to claim 1 wherein said spatial filter comprises an optical aperture dimensioned to read a corresponding first reading range of said scale, and limiting means for limiting the scale to a second reading range less than said first reading range, whereby a said sampling region of said scale is defined by said second reading range, said pass band being inversely proportional to said second reading range.

16. Apparatus according to claim 1 wherein a dominant periodicity of said scale is defined by positions spaced along said scale, said dominant periodicity being equal to said nominal periodicity, a said scale mark being provided substantially at each said position, such that the spacing of the marks is uniform at least within said sampling region, and any non-uniformities in said spacing of the marks lie within said pass band of said filter.

17. Apparatus according to claim 1 wherein a dominant periodicity of said scale is defined by first positions equally spaced along said scale, said dominant periodicity is equal to said nominal periodicity, at least two scale marks are present at respective said positions within said sampling region, secondary said marks are provided on said scale in second positions offset from said dominant positions, thereby providing secondary periodicities combining to define a scale band, said scale band lying within the pass band of said filter.

18. Apparatus according to claim 1 wherein said filter defines a response curve covering a range of periodicities greater than said pass band of said filter, said secondary periodicities extending at least over said greater range.

19. Apparatus according to claim 1 wherein a dominant periodicity of said scale is defined by positions equally spaced along said scale, said scale marks being provided at selected said dominant positions only.

20. Apparatus according to claim 14 wherein said read head includes a read head light source positioned to illuminate said scale at said sampling region, reflections at said marks producing said sources of illumination illuminating said diffraction means.

21. Apparatus according to claim 15 wherein said read head includes a read head light source adapted to illuminate said second reading range only, thereby to limit said sampling region.

22. Apparatus according to claim 1 wherein said filter defines a response curve covering a range of periodicities greater than said pass band of said filter, said second periodicities extending at least over said greater range.

23. Apparatus according to claim 15 wherein said read head includes a read head light source positioned to illuminate said scale at said sampling region, reflections at said marks producing said sources of illumination for illuminating said diffraction means.

24. An apparatus for measuring the displacement between first and second members, comprising
a scale, having marks thereon, provided on said first member; and
a read head provided on said second member, said read head comprising
a spatial filter, spaced from said scale, including periodic diffraction means producing interference fringes having movement relative to said read head; and
detecting means for detecting the movement relative to said read head,
the read head having optical parameters determining a nominal periodicity for said marks,
said marks being defined by reflected light sources positioned to illuminate said diffraction means and having actual periodicities at least one of which defines a departure from said nominal periodicity, the light from said reflected light sources interacting with said diffraction means to produce said fringes, said diffraction means having an optical aperture whose extent determines the maximum value of said departure which is capable of producing a detectable interaction with said diffraction means, said aperture thereby defining a pass band for said filter.

25. Apparatus according to claim 24 wherein said periodic diffraction means is a phase grating.

* * * * *